(12) United States Patent
Ray

(10) Patent No.: US 10,725,151 B1
(45) Date of Patent: Jul. 28, 2020

(54) SYSTEM AND METHOD FOR DETECTING PULSES USING FUSED SIGNAL POWER/PHASE MODULATION DETECTION

(71) Applicant: The Boeing Company, Chicago, IL (US)

(72) Inventor: Gary A. Ray, Issaquah, WA (US)

(73) Assignee: The Boeing Company, Chicago, IL (US)

(*) Notice: Subject to any disclaimer, the term of this patent is extended or adjusted under 35 U.S.C. 154(b) by 0 days.

(21) Appl. No.: 16/418,025

(22) Filed: May 21, 2019

(51) Int. Cl.
*G01S 7/285* (2006.01)
*H04L 27/22* (2006.01)

(52) U.S. Cl.
CPC .............. *G01S 7/285* (2013.01); *H04L 27/22* (2013.01)

(58) Field of Classification Search
CPC ................................ G01S 7/285; H04L 27/22
See application file for complete search history.

(56) References Cited

U.S. PATENT DOCUMENTS

| 6,876,321 | B1 | 4/2005 | Slutzky et al. | |
|---|---|---|---|---|
| 7,242,346 | B1 | 7/2007 | Slutzky et al. | |
| 9,046,593 | B2 | 6/2015 | Ray | |
| 2010/0283659 | A1* | 11/2010 | Huggett | G01S 7/021 342/20 |
| 2018/0074169 | A1* | 3/2018 | Ray | G01S 7/046 |

OTHER PUBLICATIONS

Aishwarya et al., "Pulse digitizer generator for ESM systems", Int'l J. Engineering Trends and Technology, vol. 4, Issue 9, Sep. (2013), pp. 3809-3813.
Mahmoud et al., "Radar Parameter Generation to Identify the Target", Journal of Engineering, vol. 17, No. 1, Feb. 2011, pp. 173-185.
McGregor et al., Polynomial Fitting of Data Streams with Applications to Codeword Testing, 28th International Symposium on Theoretical Aspects of Computer Science (STACS 2011), pp. 428-439, 2011.
Chan et al., Algorithms for Computing the Sample Variance: Analysis and Recommendations. Technical Report #222, Department of Computer Science, Yale University, Jan. 1981.
https://www.johndcook.com/blog/standard_deviation/.
Lists of References in U.S. Appl. No. 15/652,027, dated May 31, 2018 and Jan. 25, 2019.

* cited by examiner

*Primary Examiner* — Vineeta S Panwalkar
(74) *Attorney, Agent, or Firm* — Ostrager Chong Flaherty & Broitman P.C.

(57) ABSTRACT

A signal power detection method is fused with a double-difference phase modulation detection method to provide a higher-performance method of pulse detection for any digital receiver. The first pulse detection technique uses a signal power threshold. When the square of the magnitude of a pulse crosses the signal power threshold, the beginning of a pulse is declared and pulse processing starts. The second pulse detection technique is model based and uses a windowed detector that crosses a phase difference threshold when the pulse has consistent second-order (in general d-th order) difference phase values within the window. The first technique has low latency and is independent of pulse width, but only operates well at SNR values greater than 15 dB. The second technique has higher latency and requires a minimum pulse width, but operates at lower (approximately 0 dB) SNR values.

23 Claims, 9 Drawing Sheets

SYSTEM AND METHOD FOR DETECTING PULSES USING FUSED SIGNAL POWER/PHASE MODULATION DETECTION

BACKGROUND

The technology disclosed herein generally relates to radar pulse detection. In particular, it relates to radar pulse detection using a digital radar receiver.

A receiver system is any system configured to receive energy waves and process these energy waves to identify desired information carried in the energy waves. As used herein, an "energy wave" is a disturbance that propagates through at least one medium while carrying energy. For examples, energy waves may comprise electromagnetic waves, radio waves, microwaves, sound waves or ultrasound waves.

Typically, a receiver system includes a transducer and a receiver. A transducer may be any device configured to convert one type of energy into another type of energy. The transducers used in a receiver system are typically configured to receive energy waves and convert these energy waves into an electrical signal. An antenna is one example of a transducer. A receiver processes the electrical signal generated by a transducer to obtain desired information from the electrical signal. The desired information includes information about signals carried in the energy waves.

Oftentimes, energy waves are used to carry repetitive signals. A repetitive signal is a signal that has a time period over which some aspect of the signal repeats. Repetitive signals are used in timing operations, synchronization operations, radar operations, sonar operations, and other suitable operations. For example, the characteristics of a repetitive signal may be used to synchronize two or more devices. Repetitive signals will be hereinafter referred to as -pulses".

Digital radar receivers that detect radar signals from other radars have front-end receivers that produce pulse descriptor words (PDWs) for each radar pulse they detect. They are unlike radar systems in that they do not naturally produce range and they must handle unknown signals rather than look for reflected versions of their transmitted signals. The digital versions of these receivers are typically designed as a channelizer or filter bank; within each filter channel, radar pulses are separated from other coincident signals and have their noise decreased by the relative filter bandwidth compared to the total input bandwidth. These pulses with their increased signal-to-noise ratio (SNR) are processed to generate data representative of estimated signal characteristics of interest, such as phase modulation parameters, frequency, bandwidth, time of arrival, time of departure, pulse width, pulse amplitude, pulse repetition interval, and/or angle of arrival. While such channelizers have many advantages, they also have key disadvantages such as large size, weight and power that come from all the multipliers and adders required for very large filter banks that must operate continuously whether a signal is present or not. In addition, signals that do not match the bandwidth and frequency of each filter in the filter bank are processed sub-optimally or split across filter channels, resulting in missed, false and inaccurate PDWs. If a channelizer is not used, the two main processing tasks of noise reduction and signal separation must be done using different methods. In either case, separated signals must be processed for PDW information for each received pulse. In order to achieve reliable PDW processing, there must be reliable pulse detection.

Existing solutions to pulse detection rely on threshold crossing as the main method of detection. Thus, this approach limits the processing of pulses to those with relatively high signal-to-noise ratio (pulses that are easily distinguishable from the noise). This in turn limits the detection range of any receiver that uses the threshold technique (unless the transmitter signal power is increased).

SUMMARY

The subject matter disclosed in detail below is directed to systems and methods for better detection of pulses through a combination of two distinct approaches that complement each other. One approach is the conventional approach that uses a signal power threshold; when a pulse's magnitude crosses the threshold, the beginning of a pulse is declared and pulse processing starts. The other approach is model based and uses a windowed detector that crosses a threshold when the pulse has consistent double (in general d-th) difference phase values within the window. The first approach has low latency and is independent of pulse width, but only operates well at -good" (greater than 15 dB) SNR values. Thus, the signal power detection technique is limited to easily distinguished pulses. The other approach has higher latency and requires a minimum pulse width, but operates at lower (approximately 0 dB) SNR values. The design proposed herein fuses these two approaches to produce a pulse detector that has low latency for higher SNR pulses, but with additional latency can detect low-SNR pulses as well.

More specifically, a signal power detection method is fused with a double-difference phase modulation detection method to provide a higher-performance method of signal detection for any digital receiver that processes pulsed signals. The method proposed herein enables accurate detection of pulses under a wide variety of conditions and thus can be used for detection of any radar-type signals. The fused pulse detector can be used as part of either a traditional EW channelizer or blind source separation-based EW receiver to continuously detect the incoming signals before pulse processing occurs. In fact, this approach can operate as part of any digital receiver architecture that processes pulsed signals in a streaming fashion.

In accordance with some embodiments, the system and method share the following features: (1) fusion of signal power- and phase-based pulse detection methods; (2) enables detection of pulses with lower power and greater range; (3) thresholds are continuously updated to handle changing noise conditions; and (4) the window in the phase modulation detection method is also continuously updated to handle changing noise conditions.

The features described in the immediately preceding paragraph provide benefits including higher-quality signal detection and characterization with available hardware and also enable digital receivers to be made smaller and less costly and use less power. Correspondingly, these features also enable higher-performance digital receivers by enabling more accurate signal detection under more difficult signal environments.

Although various embodiments of systems and methods for detecting pulses using a fused signal power/phase modulation detection technique will be described in some detail below, one or more of those embodiments may be characterized by one or more of the following aspects.

One aspect of the subject matter disclosed in some detail below is a method for detecting pulses in a received signal in a streaming manner, comprising: (a) sampling a received signal to produce samples which are in digital format; (b) estimating a respective signal power of the received signal for each sample; (c) determining that the signal power estimated in step (b) is less than a signal power threshold; (d) estimating a respective instantaneous signal phase of the received signal for each signal sample of a multiplicity of signal samples within a window; (e) estimating a respective second-order difference of the signal phases of the multiplicity of the samples within the window; (f) determining that the second-order difference estimated in step (e) is less than a phase difference threshold; and (g) processing the samples within the window to generate information vectors comprising respective data sets of parameter values of pulses in the received signals.

In accordance with some embodiments, the method described in the immediately preceding paragraph further comprises: (h) computing a real-time filtered estimate of the signal power threshold based on the signal power of the received signal for the samples, an initial noise power and a desired probability of false alarm; (i) sending the signal power threshold to a signal power threshold comparator that performed step (c); (j) generating desired probability of false alarm and desired probability of detection curves; (k) constructing a look-up table comprising data values representing the desired probability of false alarm and desired probability of detection curves generated in step (j); and (l) retrieving the window length and the phase difference threshold from the look-up table based on a desired probability of false alarm, a desired probability of detection and a measured signal-to-noise ratio.

In accordance with one application, the method further comprises: storing the data sets of parameter values of the information vectors in a non-transitory tangible computer-readable storage medium; identifying a signal emitter based on the stored data sets of parameter values; locating the signal emitter relative to a frame of reference; and sending control signals to an actuator controller of a vehicle, which control signals direct a movement of the vehicle based on the location of the signal emitter.

Another aspect of the subject matter disclosed in some detail below is a method for detecting pulses in a received signal in a streaming manner, comprising: (a) sampling a received signal to produce samples which are in digital format; (b) estimating a respective signal power of the received signal for each sample; (c) determining that the signal power estimated in step (b) is less than a signal power threshold; (d) estimating a respective d-th-order difference of phases of a multiplicity of the samples within a window subsequent to step (c), wherein d is an integer greater than unity; (e) determining that the d-th-order difference estimated in step (d) is less than a phase difference threshold; and (f) processing the samples within the window to generate information vectors comprising respective data sets of parameter values of pulses in the received signals.

A further aspect of the subject matter disclosed in some detail below is a system for detecting pulses in a received signal in a streaming manner, comprising: a transducer for converting received energy waves into a received signal in electrical form; a filter for passing a portion of the received signal having a frequency within a selected frequency bandwidth; an analog-to-digital converter configured to sample the received signal output by the filter to produce signal samples; a pulse processing module configured to process the signal samples to generate information vectors comprising respective data sets of parameter values of pulses in the received signals; a buffer configured to store a window of signal samples; a signal power detector configured to direct the signal samples to the pulse processing module if a signal power in excess of a signal power threshold is detected or to direct the signal samples to the buffer if the signal power is not in excess of the signal power threshold; and a pulse modulation detector connected to receive the signal samples which are sent to the buffer and configured to direct the signal samples from the buffer to the pulse processing module if a second-order difference in phase of successive signal samples in the window is less than a phase difference.

In accordance with some embodiments, the signal power detector comprises: a signal power estimation module configured to estimate a respective signal power of the received signal for each sample; and a signal power threshold comparator configured to determine whether the signal power estimated by the signal power estimator is greater than a signal power threshold or not. In addition, the pulse modulation detector comprises: a complex sample estimation module configured to compute a phase of each sample; a phase difference estimation module configured to estimate a respective second-order difference of phases of a multiplicity of the samples within the window; and a second-order difference threshold comparator configured to determine whether the second-order difference estimated by the phase difference estimation module is less than a phase difference threshold or not.

In accordance with one application, the system described in the immediately preceding paragraph further comprises: a non-transitory tangible computer-readable storage medium storing the data sets of parameter values of the information vectors generated by the pulse processing module; and a computer system configured to identify a signal emitter based on the stored data sets of parameter values, locate the signal emitter and send control signals to an actuator controller of a vehicle, which control signals direct a movement of the vehicle based on a location of the signal emitter.

In accordance with some embodiments, the system further comprises a noise power estimation module configured to compute a real-time filtered estimate of the signal power threshold based on input sample powers, an initial noise power and a desired probability of false alarm. In addition, the system further comprises a probability of false alarm/probability of detection table configured to use the signal power threshold from the noise power estimation module to produce a window length and the phase difference threshold.

Other aspects of systems and methods for detecting pulses using a fused signal power/phase modulation detection technique are disclosed below.

BRIEF DESCRIPTION OF THE DRAWINGS

The features, functions and advantages discussed in the preceding section may be achieved independently in various embodiments or may be combined in yet other embodiments. Various embodiments will be hereinafter described with reference to drawings for the purpose of illustrating the above-described and other aspects.

Reference will hereinafter be made to the drawings in which similar elements in different drawings bear the same reference numerals.

DETAILED DESCRIPTION

Figure 1:
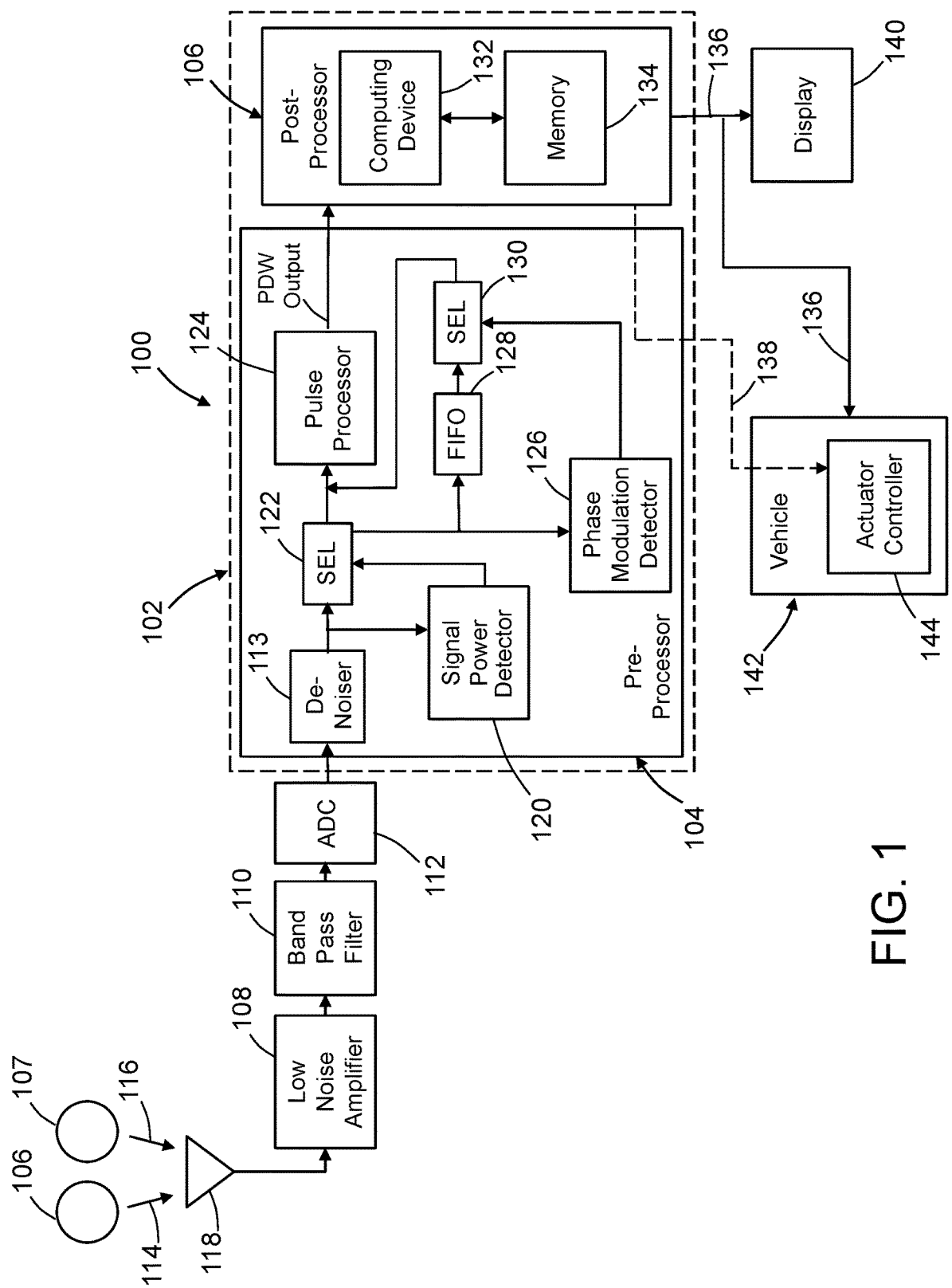
FIG. 1 is a block diagram identifying some components of a signal processing system for generating pulse descriptor words (PDWs) using fused signal power/phase modulation detection.

Illustrative embodiments of systems and methods for detecting pulses using a fused signal power/phase modulation detection technique are described in some detail below. However, not all features of an actual implementation are described in this specification. A person skilled in the art will appreciate that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

In accordance with embodiments described in some detail below, a threshold detection method is fused with a double-difference phase modulation detection method to provide a higher-performance method of signal detection for any digital receiver that processes pulsed signals in a streaming fashion. The method proposed herein enables accurate detection of pulses under a wide variety of conditions and thus can be used for detection of any radar-type signals. The fusion of threshold and phase-based pulse detection methods proposed herein enables detection of pulses with lower power and greater range. Thresholds are continuously updated to handle changing noise conditions. In addition, the window in the phase modulation detection method is also continuously updated to handle changing noise conditions.

The system disclosed herein takes as input a sampled form of a received signal $\{z_n\}$ and detects when a pulsed signal is present based on two different but fused detectors. The signal power detector simply uses the square of the magnitude of the samples $|z_n|^2$ and detects when they are larger than a threshold T. The double-difference phase modulation detector detects when a polynomial phase-modulated signal of order 2 is present by measuring the variance of the second-order difference and detecting when this variance is less than an phase threshold D. A polynomial phase-modulated signal of order 2 (e.g. a linear chirp) is given by the following equation:

$$z_n = s(t_n) = e^{2\pi i (a t_n^2 + b t_n + c)} \quad (1)$$

where $t_n$ are the sample times and a, b, c are constant parameters that control the chirp rate. Such a signal has many applications in radar for range and range rate measurement. It is typically defined by one parameter set $\{a_{up}, b_{up}, c_{up}\}$ (say an up chirp for each period) or by a period pair, an up chirp which increases in frequency and a down chirp which decreases in frequency. These period pairs would then have a pair of parameter sets $\{a_{up}, b_{up}, c_{up}\}$ and $\{a_{down}, b_{down}, c_{down}\}$ associated with them.

To detect such a signal, this invention continuously produces two thresholds T and D as well as a window size W. These control the detection processing and are based on two parameters (desired probability of false alarm PFA and desired probability of detection PD). These thresholds are continuously updated by circuits that track the (potentially) changing noise level so as to keep the detector optimal with respect to the noise level.

Note that in the general polynomial phase signal (not just the linear chirp) case, a phase-modulated signal is defined as $$s(t) = e^{2\pi i f(t)} \quad (2)$$

where f(t) is a real-valued polynomial of degree $d_f-1$ with a parameter vector of length $d_f$. In this case a $d_f$-order phase difference would be used for detection.

For the sake of illustration, an embodiment will now be described that separates incoming radar pulses and then generates pulse descriptor words (PDWs) for use in controlling a vehicle. However, it should be appreciated that the system disclosed herein may be used in applications other than vehicle control.

FIG. 1 is a block diagram identifying components of a signal processing system 100 for generating PDWs using fused signal power/pulse modulation detection in accordance with an example embodiment. FIG. 1 shows an example system used in an electronic warfare (EW) receiver. (Note that the techniques being described herein could also be used in a traditional channelizing receiver.)

In the exemplary embodiment depicted in FIG. 1, the signal processing system 100 includes a signal data processor 102 communicatively coupled to an antenna 118 by way of signal pre-conditioning circuitry. In this example, the signal pre-conditioning circuitry includes a low-noise amplifier 108, a band pass filter 110, and an analog-to-digital converter (ADC) 112. Antenna 118 may be a wide-area sensor configured to surveil at least one radar signal emitter (two radar signal emitters 106 and 107 are indicated in FIG. 1). In operation, the signal pre-conditioning circuitry converts a sensor output signal received from antenna 118 into a conditioned signal. Each conditioned signal is derived from a time-varying signal received at antenna 118. Time-varying signals may include a mix of signals received from radar signal emitters 106 and 107. For example, time-varying signals may include a first radar signal 114 generated by radar signal emitter 106 or a second radar signal 116 generated by radar signal emitter 107, which signals are received by antenna 118.

The signal data processor 102 includes a pre-processor 104 and a post-processor 106. The conditioned signals are transmitted to pre-processor 104. The pre-processor 104 includes a multiplicity of signal de-noising modules 113 (only one of which is depicted in FIG. 1) and a corresponding multiplicity of pulse processing modules 124 (only one of which is depicted in FIG. 1). The conditioned signals undergo signal de-noising by signal de-noising module 113 before undergoing pulse detection to determine whether the de-noised signal samples should be sent to the associated pulse processing module 124. Post-processor 106 is communicatively coupled to receive the output from the pulse processing modules 124.

For example, the radar signal 114 is initially received at antenna 118 as a pulse having signal characteristics including, without limitation, a frequency and a bandwidth. In this example, a single pulse of first radar signal 114, after processing by the pre-conditioning circuitry, is then received at the signal de-noising module 113 as a mixed signal (i.e., the conditioned signal represents a signal pulse of the first radar signal 114 and has various characteristics including, without limitation, noise and information other than the desired information of interest). The signal de-noising module 113 de-noises the mixed incoming signal and outputs a de-noised signal having a frequency and a bandwidth (or a regular pattern of frequencies and bandwidths).

De-noised signal samples undergo pulse processing only if pulses are detected by the fused signal power/pulse modulation detector system disclosed herein. The pre-processor 104 includes a respective fused pulse detector for each pulse processing module 124. In accordance with the embodiment depicted in FIG. 1, the fused pulse detector includes a signal power detector 120 and a phase modulation detector 126. The signal power detector 120 is connected to receive the de-noised signal samples from the signal de-noising module 113. The pre-processor 104 further includes a first selector 122 having an input port that also receives the de-noised signal samples from the signal de-noising module 113. The first selector 122 has first and second output ports which may be switchably connected to the input port. The state of the first selector 122 is controlled by the signal power detector 120. If the signal power detector 120 detects a signal having a power in excess of a specified signal power threshold, then the signal power detector 120 outputs a first selector state control signal that causes the first selector 122 to pass the de-noised signal samples to the pulse processing module 124. This is accomplished by internally switchably connecting the input port of the first selector 122 to the first output port of the first selector 122.

The pre-processor 104 further includes (introduced above) a first-in first-out buffer 128 (hereinafter FIFO buffer 128"), wherein both the phase modulation detector 126 and the FIFO buffer 128 have input ports connected to a second output port of the first selector 122, and a second selector 130 having an input port connected to the output port of FIFO buffer 128. If the signal power detector 120 detects a signal that does not have a power in excess of the specified threshold, then the signal power detector 120 outputs a second selector state control signal that causes the first selector 122 to pass the de-noised signal samples to phase modulation detector 126 and FIFO buffer 128 instead of to the pulse processing module 124. This is accomplished by internally switchably connecting the input port of the first selector 122 to the second output port of the first selector 122.

The state of the second selector 130 is controlled by the phase modulation detector 126. If the phase modulation detector 126 detects a signal having a second-order difference less than a specified phase difference threshold (meaning that a pulse has been detected), then the phase modulation detector 126 outputs a third selector state control signal that causes the second selector 130 to pass the output of the FIFO buffer 128 to the pulse processing module 124. This is accomplished by internally switchably connecting the input port of the second selector 130 to a first output port of the second selector 130. If the phase modulation detector 126 detects a signal having a second-order difference greater than a specified phase difference threshold (meaning that a pulse has not been detected), then the phase modulation detector 126 outputs a fourth selector state control signal that causes the second selector 130 to not pass the output of the FIFO buffer 128 to the pulse processing module 124. This is accomplished by internally switchably connecting the input port of the second selector 130 to a second output port of the second selector 130.

Each pulse processing module 124 comprises a PDW generation module which is configured to generate PDW parameter vector signals. Each PDW parameter vector signal contains data representative of characteristics of interest of one of radar signals 114 and 116 (e.g., frequency, bandwidth, time of arrival, time of departure, pulse width, pulse amplitude, pulse repetition interval, and/or angle of arrival). PDW parameter vector signals are transmitted to post-processor 106. The post-processor 106 comprises a computing device 132 and a memory 134. The computing device 132 is configured to perform operations based on data contained in the PDW parameter vector signals. Such operations include, without limitation, detecting, processing and quantifying. Resultant data from operations performed by the computing device 132 are stored in memory 134. The memory 134 comprises one or more non-transitory tangible computer-readable storage media. In accordance with one embodiment, the computing device 132 is a processor configured to execute instructions in the form of software.

In accordance with one implementation, the PDW generation module will send each PDW to the computing system 132 as a PDW parameter vector signal similar to (amplitude, time of arrival, center frequency, pulse width and bandwidth)=(amp, toa, cf, pw, bw). The PDW for each intercepted signal is stored in a pulse buffer for further processing by the computing system 132. As part of such processing, the PDWs are sorted and deinterleaved by clustering the incoming radar pulses into groups. In principle, each group should have characteristics representative of a single radar source or class of radar sources which allows that radar source or class to be identified. The identity of a particular signal is usually inferred by correlating the observed characteristics of that signal with characteristics stored in a list that also contains the identity of known radars. In addition to comprising a deinterleaver that identifies the radar emitter, the computing system 132 further comprises a geolocation engine for determining the coordinates of the location of the identified radar emitter.

Further, in the exemplary embodiment depicted in FIG. 1, the computing device 132 causes post-processor 106 to transmit a human-readable data signal 136 to a human-machine interface to facilitate at least one of an interaction, a modification, a visualization, at least one further operation, and a viewable recording of information about at least one radar signal 114 and 116 by a user of signal processing system 100. The human machine interface may be, for example, a display device 140 which receives the human-readable data signal 136 from post-processor 106. In one example, characteristics of radar signal emitters 106 and 107 determined by signal processing system 100 are displayed on display device 140 as a map having a grid representative of a physical spatial domain including a surveilled space, where locations and identifying information of radar signal emitters 106 and 107 are displayed and plotted substantially in real time. The human-readable data signal 136 may also be transmitted from post-processor 106 to at least one device and/or system (e.g., an aerial or ground-based vehicle 142) associated with signal processing system 100. Further, the computing device 132 enables post-processor 106 to transmit, in substantially real time, an actuator control signal 138 to an actuator controller 144 included within vehicle 142 to direct or control movements thereof. For example, vehicle 142 may be a remotely and/or autonomously operated land vehicle or an unmanned aerial vehicle.

In one mode of operation, at least one of frequency and bandwidth information contained in respective PDWs is plotted on a map on the display device 140 along with locations of respective radar signal emitters 106 and 107 to facilitate accurate tracking of locations and association with those particular radar signal emitters. In cases where at least one radar signal emitter is mobile, the map on display device 140 updates location information of at least one respective mobile radar signal emitter in substantially real time. Furthermore, the computing device 132 determines at least one of a velocity, an acceleration, a trajectory, and a track (i.e., including present and prior locations) of one or more mobile radar signal emitters (e.g., radar signal emitters 106 and 107). In another mode of operation, characteristics determined by signal data processing methods implemented by the signal data processor 102 may trigger a variety of substantially real-time physical actions in physical devices and systems in communication with the signal processing system 100. For example, characteristics of various radar signal emitters, including frequency and bandwidth determined by signal data processing methods implemented by signal processing system 100, may be transmitted in substantially real time as data to actuator controller 144 in vehicle 142 (e.g., rudders and flaps of a unmanned aerial vehicle) to direct movement or facilitate maneuvers thereof, for example, to avoid an area of operation of an unauthorized radar signal emitter determined to be a threat or to move toward the unauthorized emitter to eliminate the threat. As a further example, characteristics of radar signal emitters 106 and 107 determined by signal data processing methods described herein may be transmitted in substantially real time in a control signal to at least one of an electronic support measure (ESM) device and an EW system associated with signal processing system 100 to direct, for example, a radar jamming signal at a particular radar signal emitter operating in the surveilled environment without authorization.

The phase modulation detector 126 continuously produces signals representing detection values $\hat{d}$ based on a window of signal samples. The phase modulation detection requires knowledge of the instantaneous phase of the incoming signal at each sample. Therefore this phase must be estimated in any one of a number of well-known ways, such as the phase estimation method disclosed in U.S. Patent Application Publication No. 2019/0020504.

Figure 2:
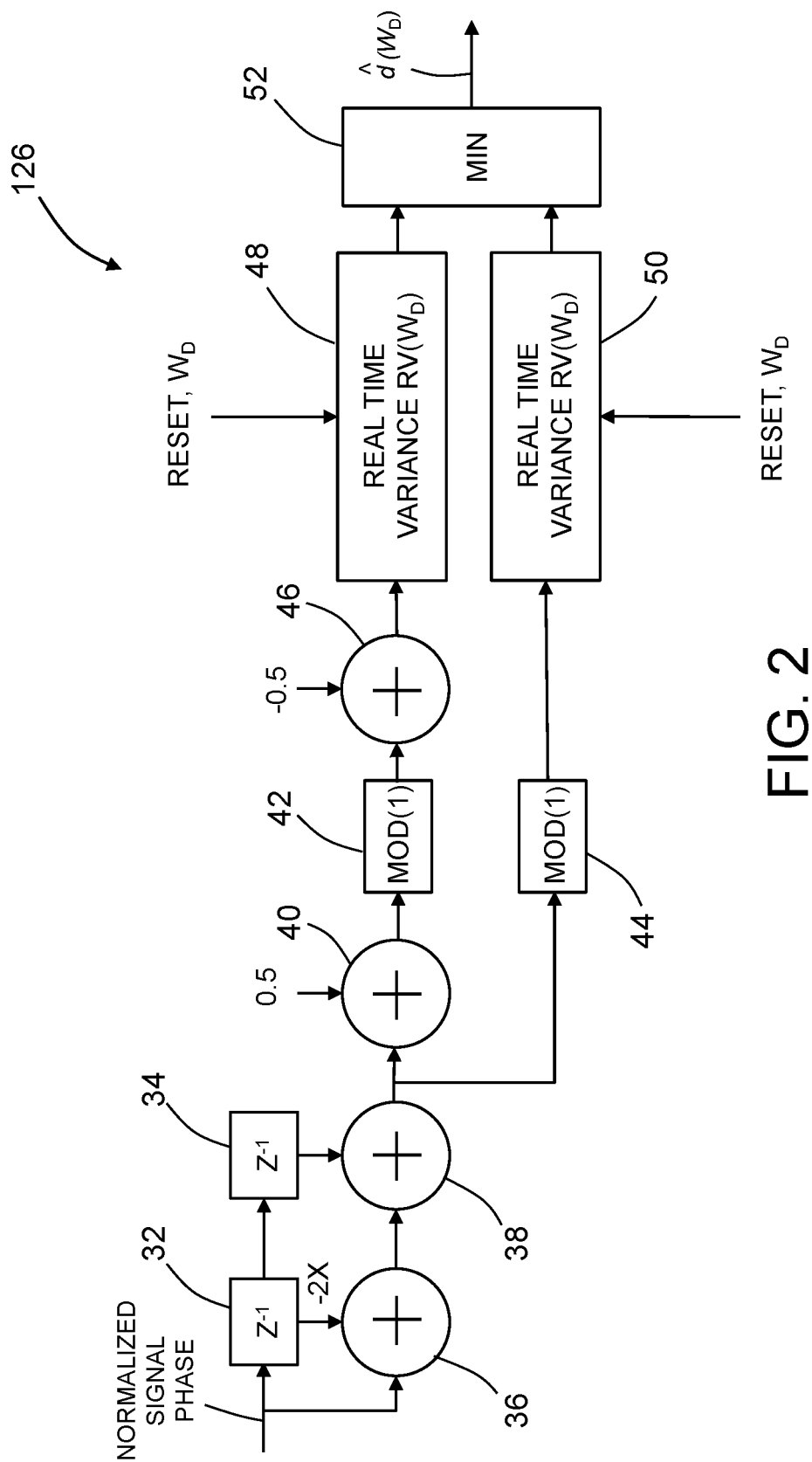
FIG. 2 is a flowchart identifying steps of a method for streaming second-order difference phase modulation detection of linear chirp signals in accordance with one embodiment.

FIG. 2 is a flowchart identifying steps performed by the phase modulation detector 126 (see FIG. 1) in accordance with one embodiment. The notation is as follows: $Z^{-1}$ denotes a register or memory element (i.e., registers 32 and 34 in FIG. 2) which also serves to delay a value by one clock period; the encircled—"+symbols denote summation (i.e., summers 36, 38, 40 and 46); Mod(1) denotes respective modulo 1 circuits 42 and 44 configured to perform the standard digital modulo 1 computation of each normalized value between −1 and 1 (this happens naturally in digital arithmetic circuits); and $RV(W_D)$ denotes respective variance estimation circuits 48 and 50 configured to perform real-time windowed variance estimation (where $W_D$ is the length of the window) in parallel based on the respective signals output by summer 46 and modulo 1 circuit 44. (A variance is the expectation of the squared deviation of a random variable from its mean, and it informally measures how far a set of (random) numbers are spread out from their mean.) The two variance calculations are based on two possible phase paths offset by $\pi/2$. This allows the variance calculation to work correctly even when the angles are near the extremes of +1 and −1. A minimum variance circuit 52 receives the outputs from the variance estimation circuits 48 and 50, selects the minimum of the two inputs, and then outputs the detection value $\hat{d}(W_D)$.

The phase modulation detection process shown in FIG. 2 comprises: (1) a new real-time windowed variance estimation method using very few resources and no divisions and suitable for hardware implementation; and (2) the use of a parallel streaming computation that can pick the best modulo value within a window of samples. This reduces the overall detection latency over other methods.

The foregoing approach is based on the fact that a quadratic polynomial sampled function has a constant second-order difference, i.e., $\Delta^2\{Q_i\}=Q_{i+2}-2Q_{i+1}+Q_i$ is constant without noise. (A quadratic polynomial is a polynomial function that contains terms of at most second degree.) Thus, measuring the variance of a noisy quadratic sampled function gives a measure of how non-constant a noisy second-order difference would appear. Since a polynomial function of phase (normalized between 1 and −1) is being measured, phase would wrap at those end points and this would complicate the problem. For example, a phase of 0.9 that advances by 0.2 on the next sample would become 1.1, which wraps to −0.9. Thus phase near the end points would jump in value and this would cause jumps in the second-order difference, even though it should be constant. To eliminate this problem, two computational channels are provided which measure phase and phase offset by ½. Thus one of the two should have few or no jumps and thus the minimum of the variance is taken as the metric to determine detection. It is easily generalizable to non-linear chirps, i.e., polynomials of any degree d, by computing the d-th-order difference $\Delta^d$. In the following example, the second-order difference is used. The second-order difference phase modulation detection process is represented herein as $\Delta^2$Phase while the window $W_D$ is often denoted in what follows by W.

Note that in addition to the real-time variance methods mentioned previously, an alternative approximate variance that does not require any divisions is described (but does require a table lookup of $1/W_D$ from a PFA/PD table). The iterations for this real-time approximate variance are given in the equations below for an input sequence $\{x_n\}$:

$$u_n = u_{n-1} + (1/W)x_n - (1/W)x_{n-W}$$

$$v_n = v_{n-1} + (x_n - u_n)^2 - (x_{n-W} - u_{n-W})^2$$

Along with the detection of the phase modulation, an estimate of SNR is also available from this method. Specifically, an SNR value can be estimated using the value $\hat{d}(W_D)$ of the minimum variance by interpolating from a look-up table. Specifically, this can be done by simulation to create a table of values that map $\hat{d}$ to SNR (dB). The SNR value can, for example, be made available for to the pulse processing module 124 (see FIG. 1) if desired since other signal processing can benefit a great deal by having an SNR estimate. The SNR value may also be added to the PDW generation output vector.

Thus, the pulse detection methodology proposed herein fuses a combination of two distinct pulse detection techniques that complement each other. The signal power detector 120 detects a pulse when its power (magnitude squared) crosses a specified signal power threshold. Using this technique, the beginning of a pulse can be accurately declared with essentially no latency and this determination is independent of pulse width. However, the threshold method only works reliably for SNRs above 15 dB. The phase modulation detector 126 is a windowed detector in which a specified phase difference threshold is crossed when the signal being detected has consistent phase values (indicative of a pulse) within the window. The fused pulse detector (signal power detector 120 backed up by phase modulation detector 126) has low latency for higher SNR pulses, but with additional latency can detect low-SNR pulses as well. The incoming de-noised signal samples are initially screened by the signal power detector 120, which directs the signals to the pulse processing module 124 if pulses are detected or directs the signals to the phase modulation detector 126 and the FIFO buffer 128 if pulses are not detected. The signals received by the FIFO buffer 128 are also screened by the phase modulation detector 126, which directs the signals from the FIFO buffer 128 to the pulse processing module 124 if pulses are detected or does not direct those signals to the pulse processing module 124 if pulses are not detected.

Standard threshold detection performance can be captured in a receiver operating characteristics graph which contains a set of SNR curves for a given probability of false alarm (PFA) and probability of detection (PD). For example, the ROC graph indicates that PFA of 0.2% and a PD of 99% would require an SNR of about 15 dB. Typical systems do a tradeoff to determine both the benefits and costs of missing a pulse that is there and correspondingly detecting a pulse that is not there. For example, a threat radar detector has a high cost of missing a detected pulse but will tolerate false detections, while a surveillance sensor has a high processing cost of processing many false detections, but can withstand lower detection rates.

Figure 3:
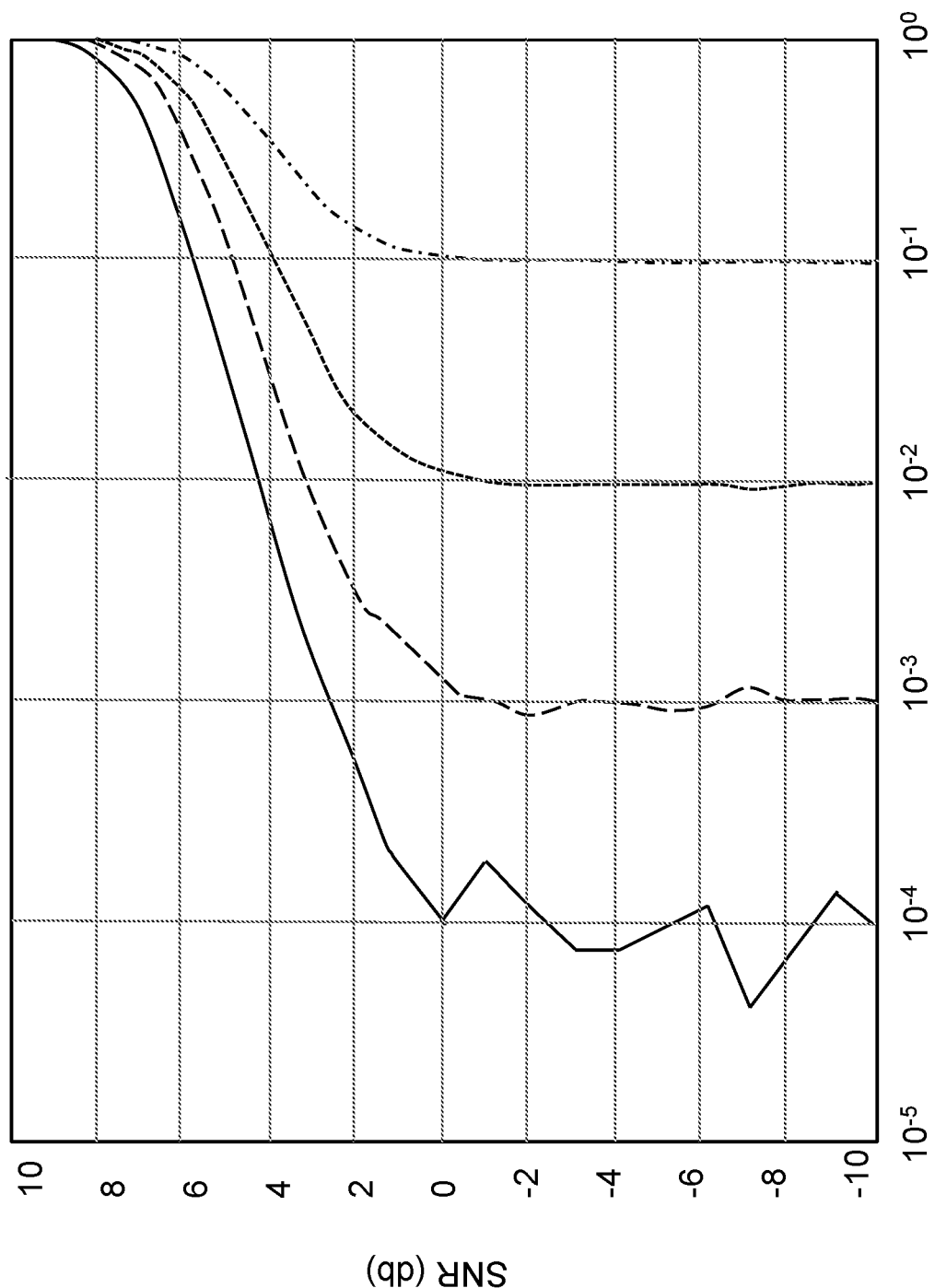
FIG. 3 is a graph showing the probability of detection curves at given false alarm rate settings for a window of 100 sub-samples.

By contrast the phase modulation detection method depicted in FIG. 2 has much better detection at lower SNR levels. FIG. 3 is a graph showing the probability of detection curves (SNR versus PD) at given false alarm rate settings for a window of 100 sub-samples. Thus, the method shown in FIG. 2 gives good results even below 9 dB SNR, well under the typical SNRs required for reliable detection of signals (usually 12 or 15 dB). The cost of this approach is some latency (given by the window length) and restrictions on pulse width.

Figure 4:
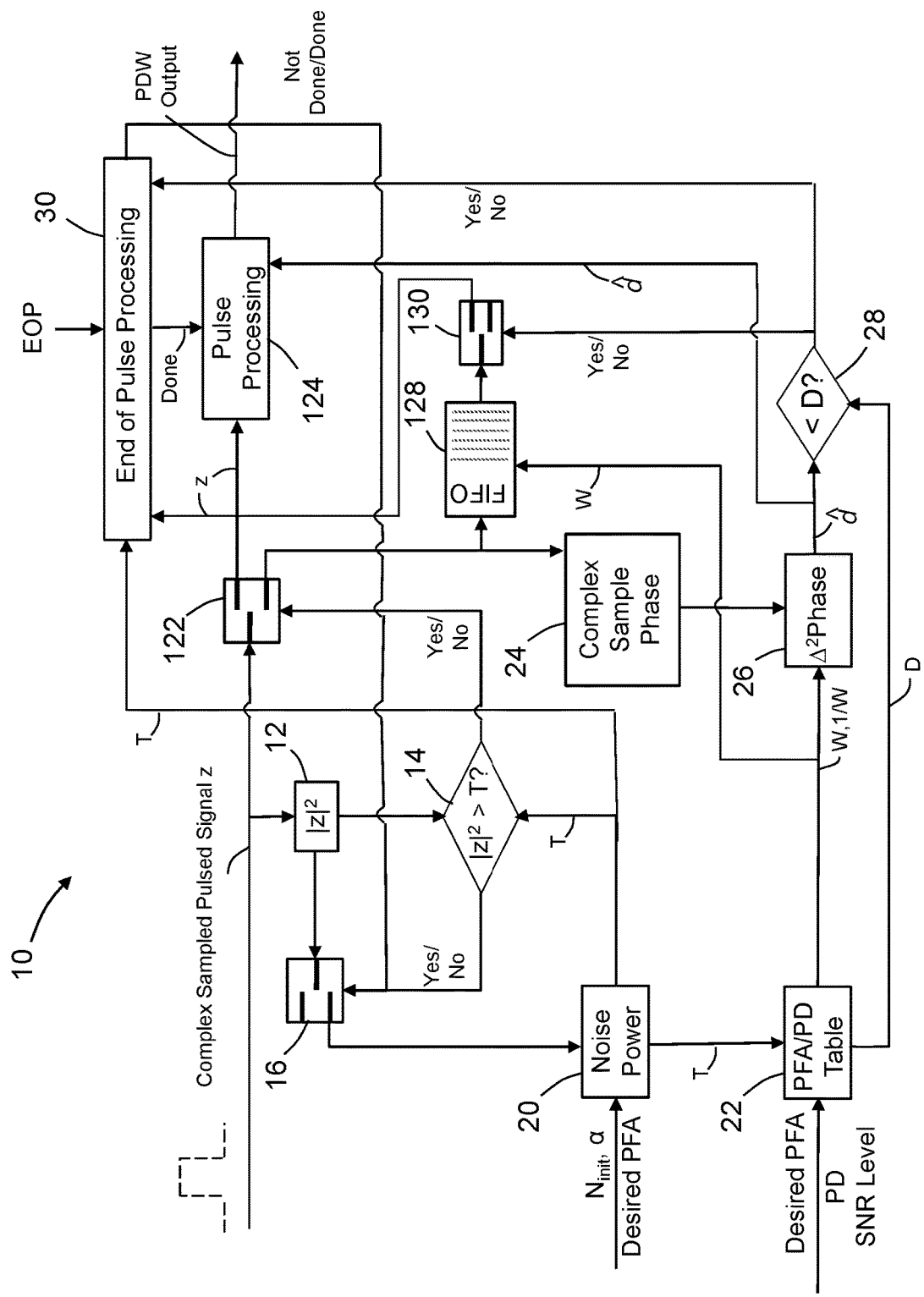
FIG. 4 is a flowchart identifying steps of a method for fused pulse detection in accordance with one embodiment.
Figure 5:
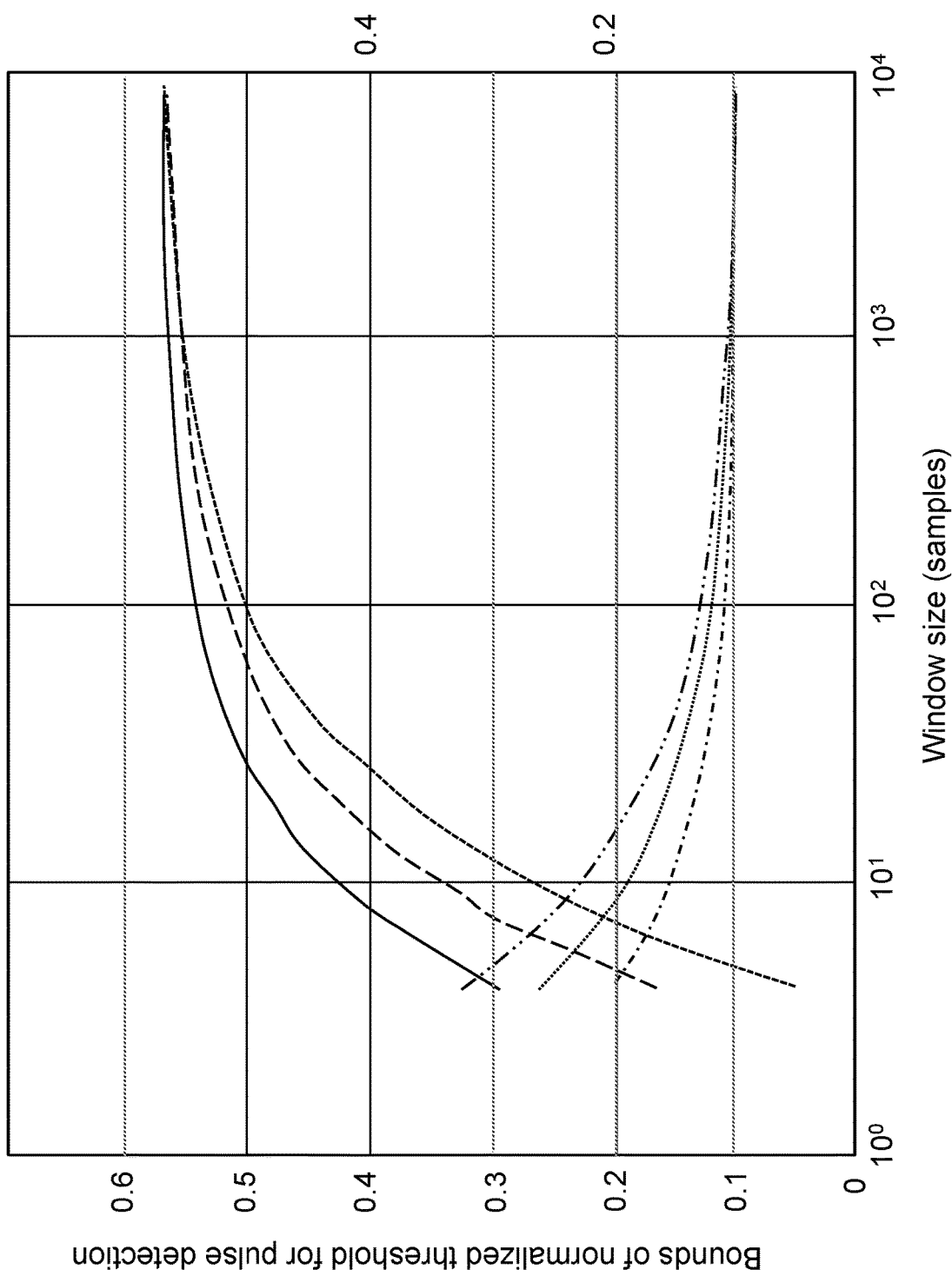
FIGS. 5-9 are graphs showing probability of false alarm (PFA) and probability of detection (PD) curves represented by data stored in respective PFA/PD tables for SNRs of 15, 10, 5, 0 and −5 dB respectively.
Figure 6:
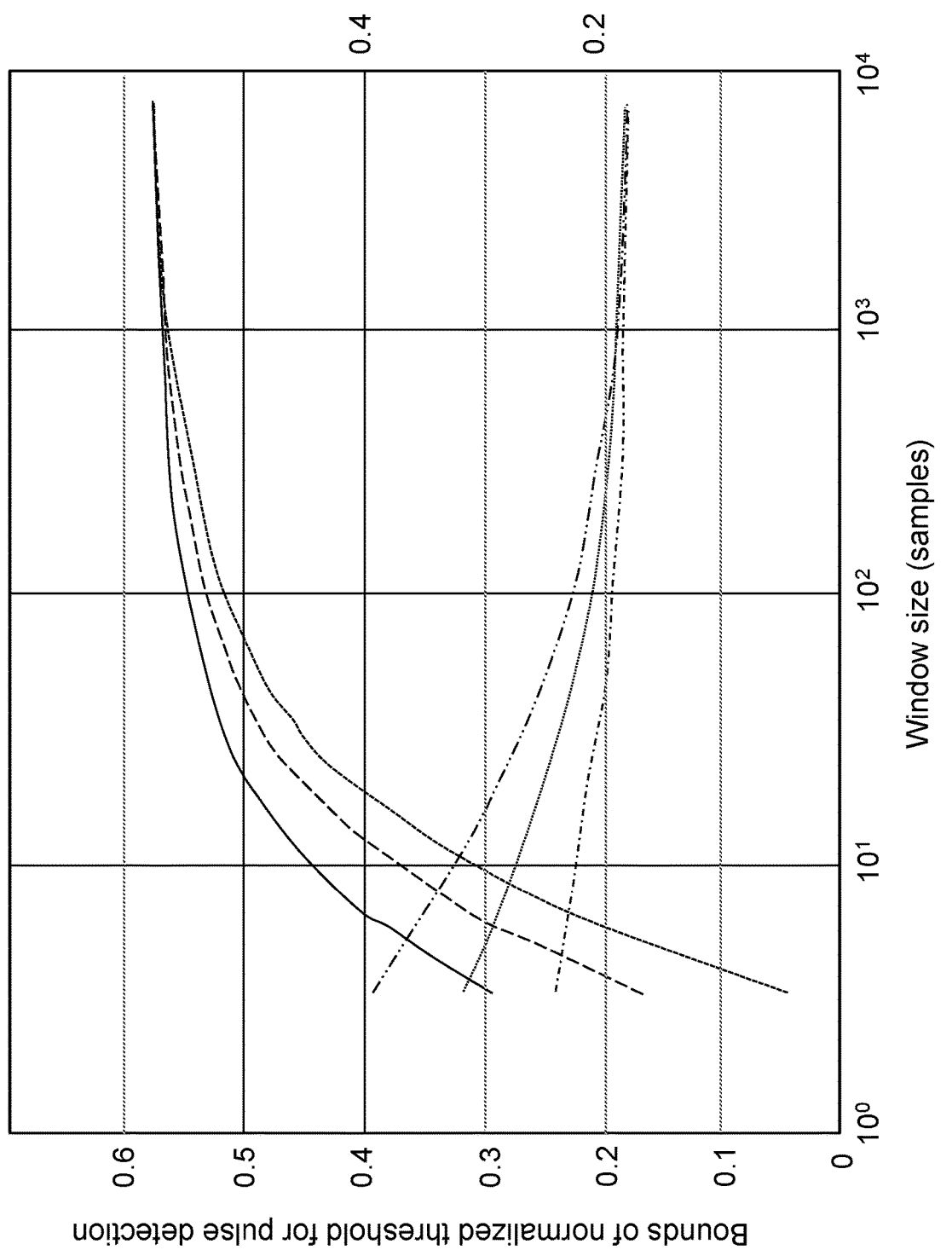

FIG. 4 is a block diagram identifying components and modules of a system 10 that uses fused pulse detection in accordance with one embodiment. The basic operation of system 10 is as follows. A complex set of samples—which may at any time contain received sampled signal pulses—streams into the fused pulse detection system as shown. Parameter inputs include the initial noise power $N_{init}$, the desired PFA and the desired PD. The signal power detector includes a signal power estimation module 12 that is configured to compute the power $|z_n|^2$ of the input signal z and a signal power threshold comparator 14 that compares the computed power to the signal power threshold T). The power $|z_n|^2$ is also output to a third selector 16.

On the one hand, if the signal power threshold comparator 14 determines that $|z_n|^2$ is greater than T, a first selector state control signal ("Yes" in FIG. 4) is sent to the first selector 122 and to the third selector 16. On the other hand, if a determination is made that $|z_n|^2$ is not greater than T; a second selector state control signal ("No" in FIG. 4) is sent to first selector 122 and third selector 16.

In response to receipt of the first selector state control signal, the first selector 122 passes the signal z to the pulse processing module 124 and to an end-of-pulse processing module 30. The pulses are processed to produce the PDW output. Conversely, in response to receipt of the second selector state control signal, the first selector 122 does not pass the signal z to the pulse processing module 124 and end-of-pulse processing module 30. Instead the first selector 122 passes the signal z to the FIFO buffer 128 and to a complex sample phase estimation module 24, which is part of the pulse modulation detector.

In response to receipt of the second selector state control signal ("No" in FIG. 4), the third first selector 16 passes the power $|z_n|^2$ to a noise power estimation module 20. Conversely, in response to receipt of the first selector state control signal ("Yes" in FIG. 4), the third first selector 16 does not pass the power $|z_n|^2$ to noise power estimation module 20.

The noise power estimation module 20 is configured to compute a real-time filtered estimate of the signal power threshold T based on the input sample powers, the initial noise power $N_{init}$ and the desired PFA. This is done by computing a running mean and variance of $|z_n|^2$, respectively denoted at time i by $\mu_i$ and $\sigma_i^2$, and then computing $$T_i = \mu_i + k\sigma_i$$

where k is determined from the cumulative distribution function of the standard normal distribution. A value of k=3 gives a PFA of 99.73%. Then $$T = (1-\alpha)T + \alpha T_i$$

using a standard exponential filter with parameter $\alpha$.

During pulse processing, samples are not sent to any of the noise power estimation module 20, FIFO buffer 128 and complex sample phase estimation module 24. If pulses are not being processed, the noise power estimation module 20 estimates what the signal power threshold T should be to get a desired PFA rate for the threshold detection method. The signal power threshold T is sent to the signal power threshold comparator 14 and to the end-of-pulse processing module 30. This signal power threshold is also used by a PFA/PD table 22 to produce a window length W for a second-order difference estimation module 26, which is part of the pulse modulation detector, and to produce a phase difference threshold D for use by a phase difference threshold comparator 28, which is also part of the phase modulation detector. The FIFO buffer 128 provides a time delay that aligns samples to the latency of the second-order difference estimation module 26.

As previously described, in response to receipt of the second selector state control signal, the first selector 122 passes the signal z to the FIFO buffer 128 and to the complex sample phase estimation module 24. The FIFO buffer 128 takes samples in at the sample clock rate and W sample times later, delivers them to the output, thus operating as a normal first in-first out" circuit would operate.

The complex sample estimation module 24 is configured to compute the phase of each sample using any known technique, including the techniques described in U.S. Patent Application Publication No. 2019/0020504. The second-order difference estimation module 26 receives the phase estimates from the complex sample estimation module 24. In accordance with one embodiment, the second-order difference estimation module 26 is configured as depicted in FIG. 2. The second-order difference estimation module 26 produces a value $\hat{d}$ that is compared to the phase difference threshold D in the phase difference threshold comparator 28.

On the one hand, if the phase difference threshold comparator 28 determines that $\hat{d}$ is less than D (indicating that a phase-modulated pulsed signal has been detected), a third selector state control signal is sent to the second selector 130 which switchably connects a first output port of the second selector 130 to the input port of the second selector 130. On the other hand, if a determination is made that $\hat{d}$ is not less than D, a fourth selector state control signal is sent to second selector 130 which switchably connects a second output port of the second selector 130 to the input port of the second selector 130. The first output port of the second selector 130 is connected to the pulse processing module 124 and to the end-of-pulse processing module 30; the second output port of the second selector 130 is not connected.

In response to receipt of the third selector state control signal, the second selector 130 passes the signal z from the FIFO buffer 128 to the pulse processing module 124 and end-of-pulse processing module 30. The pulses are processed to produce the PDW output. In accordance with one embodiment, the value $\hat{d}$ is also sent to the pulse processing module to use as an SNR estimate. Conversely, in response to receipt of the fourth selector state control signal, the second selector 130 does not pass the signal z to the pulse processing module 124 and end-of-pulse processing module 30.

The end-of-pulse processing module 30 has the following noteworthy aspects. When pulse processing is initialized by the signal power detector, the end-of-pulse processing module 30 uses a standard approach to end-of-pulse processing such as the following: when a preset number EOP of consecutive samples having a signal power less than T have been detected (the values EOP and T are both input to the end-of-pulse processing module 30), a done" signal is sent by the end-of-pulse processing module 30 to the pulse processing module 124 and to the third selector 16; otherwise a not done" signal is sent. This allows pulse processing to end in a more reliable fashion. However, if pulse processing is initialized by the phase modulation detector, the done" signal is sent in response to a signal from the phase difference threshold comparator 28 indicating that $\hat{d}$ is not less than D (meaning that pulses are no longer being detected).

Figure 9:
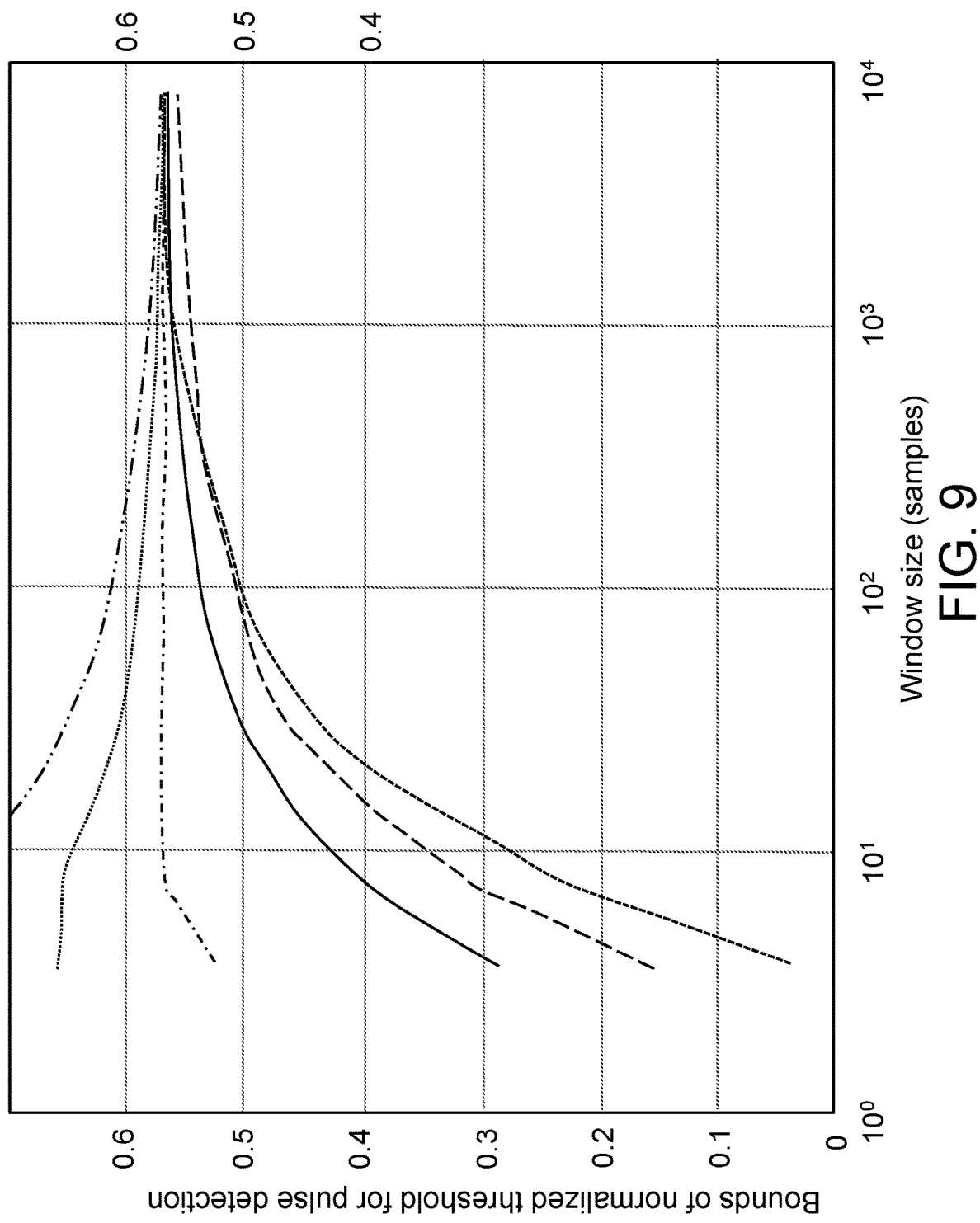

The probability of false alarm/probability of detection table 22 (Hereinafter PFA/PD table 22") is a predefined table that produces an optimal window length and detection threshold for the second-order difference phase modulation detector, based on the desired probability of false alarm, desired probability of detection and measured signal-to-noise ratio. To construct one example of a PFA/PD table 22, a simulation was completed and PFA and PD curves were generated. FIGS. 5-9 are graphs showing the PFA and PD curves represented by data stored in respective PFA/PD tables for SNRs of 15, 10, 5, 0 and −5 dB respectively. The PD curves are lower bounds on the threshold to achieve the given PD performance, while the PFA curves are upper bounds on the threshold to achieve the given PFA performance. More specifically, the lower curves are for PD equal to 0.6847 (-•-•-), 0.9545 ( . . . ) and 0.9973 (-•••-•••-), while the upper curves are for PFA equal to 0.3173 (-), 0.0455 (- - -) and 0.9973 (- - - -). FIG. 9 shows that at an SNR of −5 dB, the second-order difference phase modulation detector is useless, but at SNRs above 0 dB, the second-order difference phase modulation detector is able to perform as a detector with larger windows for lower SNR.

Figure 7:
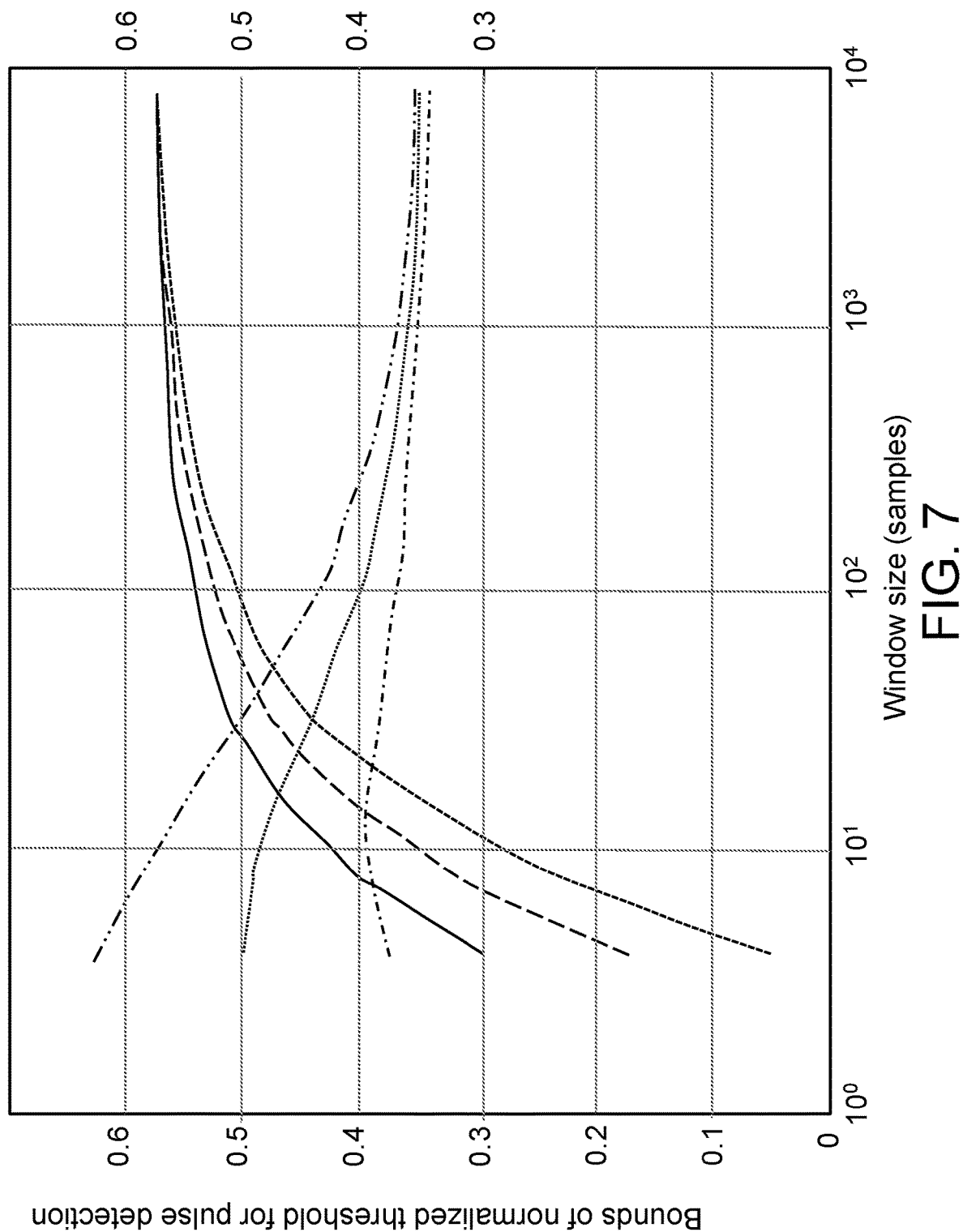
Figure 8:
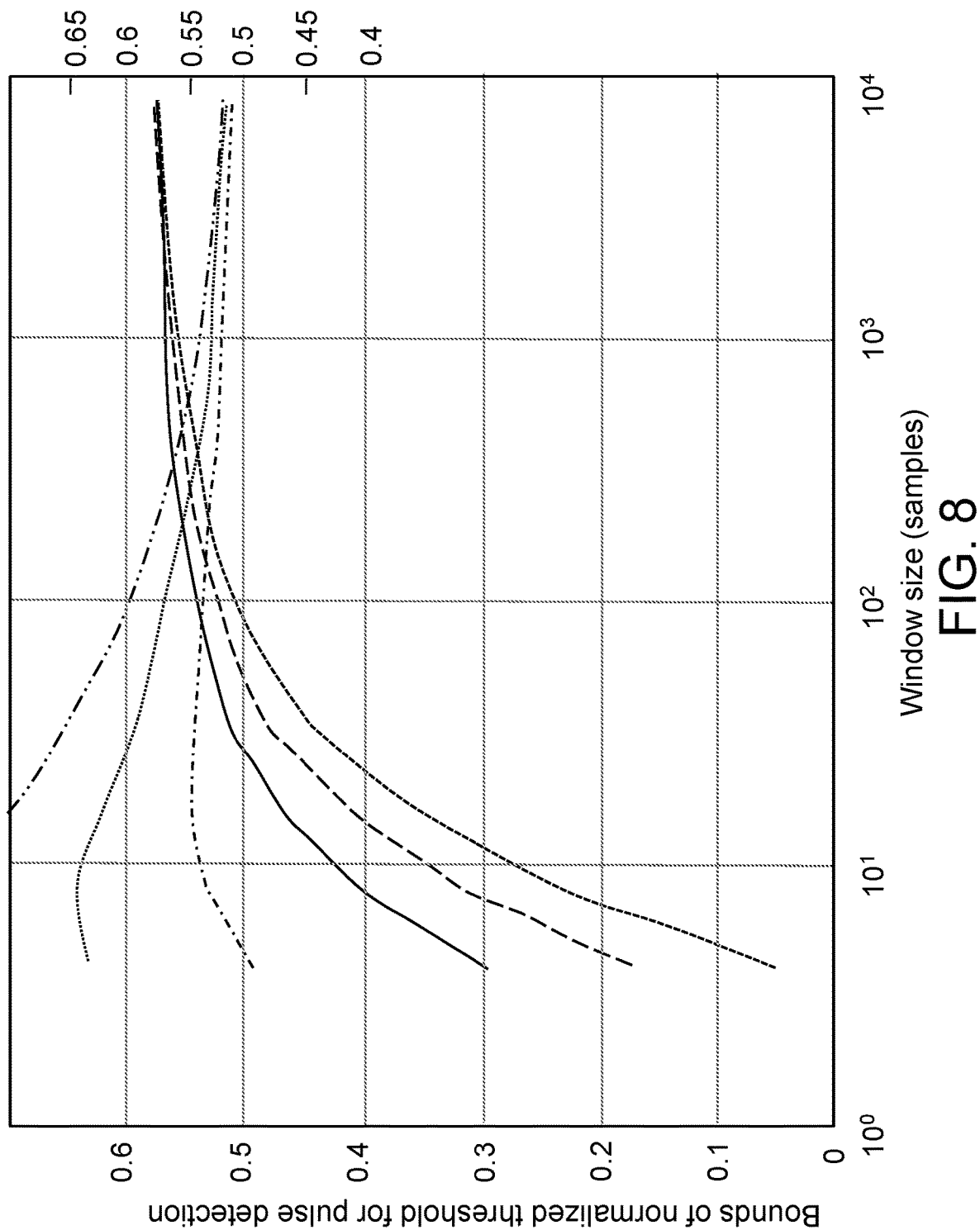

Larger windows give better performance at the expense of more latency and also mean that short pulses can be missed if they are less than the window length in pulse width. Thus, the PFA/PD table 22 would produce the minimum window length that gives the desired performance. This is determined at the intersection of the two curves, which also determines the corresponding second-order phase difference threshold D as well. For example, FIG. 7 shows that for an SNR of 5 dB, a window length W of 50 samples and a normalized second-order phase difference threshold D of 0.48 would give a PD of 99.73% with a PFA of 0.27%. Here the thresholds are normalized to a noise power level of 1.

The normalized threshold from the PFA/PD table would be multiplied by T to give the final phase difference threshold D which is used to compare against the output $\hat{d}$ of the second-order difference estimation module 26 (see FIG. 4).

Along with the stored value of W for given PFA and PD, its inverse 1/W can also be stored in the PFA/PD table 22. This eliminates the need to do division (which is typically very hardware intensive).

Methods and means for better detection of pulses through a combination (fusion) of two distinct approaches that complement each other have been described. The first pulse detection technique uses a signal power threshold. When the square of the magnitude of a pulse crosses the signal power threshold, the beginning of a pulse is declared and pulse processing starts. The second pulse detection technique is model based and uses a windowed detector that crosses a phase difference threshold when the pulse has consistent second-order difference phase values within the window.

Certain systems, apparatus, applications or processes are described herein as including a number of modules. A module may be a unit of distinct functionality that may be implemented in software, hardware, or combinations thereof. When the functionality of a module is performed in any part through software, the module can include a non-transitory tangible computer-readable storage medium. The methods disclosed above use streaming (or on-the-fly) calculations and so the modules configured to perform those calculations are suitable for FPGA or ASIC or other hardware-based implementation.

While systems and methods for detecting pulses using a fused signal power/phase modulation detection technique have been described with reference to various embodiments, it will be understood by those skilled in the art that various changes may be made and equivalents may be substituted for elements thereof without departing from the teachings herein. In addition, many modifications may be made to adapt the concepts and reductions to practice disclosed herein to a particular situation. Accordingly, it is intended that the subject matter covered by the claims not be limited to the disclosed embodiments.

The embodiments disclosed above use one or more processing or computing devices. Such devices typically include a processor, processing device, or controller, such as a general-purpose central processing unit, a microcontroller, a reduced instruction set computer processor, an ASIC, a programmable logic circuit, an FPGA, a digital signal processor, and/or any other circuit or processing device capable of executing the functions described herein. The methods described herein may be encoded as executable instructions embodied in a non-transitory tangible computer-readable storage medium, including, without limitation, a storage device and/or a memory device. Such instructions, when executed by a processing device, cause the processing device to perform at least a portion of the methods described herein. The above examples are exemplary only, and thus are not intended to limit in any way the definition and/or meaning of the terms processor" and computing device".

The process claims set forth hereinafter should not be construed to require that the steps recited therein be performed in alphabetical order (any alphabetical ordering in the claims is used solely for the purpose of referencing previously recited steps) or in the order in which they are recited unless the claim language explicitly specifies or states conditions indicating a particular order in which some or all of those steps are performed. Nor should the process claims be construed to exclude any portions of two or more steps being performed concurrently or alternatingly unless the claim language explicitly states a condition that precludes such an interpretation.

The invention claimed is:

1. A method for detecting pulses in a received signal in a streaming manner, comprising:
   (a) sampling a received signal to produce samples which are in digital format;
   (b) estimating a respective signal power of the received signal for each sample;
   (c) determining that the signal power estimated in step (b) is less than a signal power threshold;
   (d) estimating a respective second-order difference of phases of a multiplicity of the samples within a window subsequent to step (c);
   (e) determining that the second-order difference estimated in step (d) is less than a phase difference threshold; and
   (f) processing the samples within the window to generate information vectors comprising respective data sets of parameter values of pulses in the received signals.

2. The method as recited in claim 1, further comprising storing the samples within the window in a first-in first-out buffer during step (c) and prior to step (f).

3. The method as recited in claim 2, further comprising passing the samples within the window from the first-in first-out buffer to a pulse processing module configured to perform step (f) in response to step (e).

4. The method as recited in claim 1, further comprising:
   (g) estimating a respective instantaneous signal phase of the received signal for each signal sample subsequent to step (c) and prior to step (d).

5. The method as recited in claim 3, wherein step (f) is performed with a time delay that is a function of latency inherent in performance of steps (g), (d) and (e) in succession.

6. The method as recited in claim 5, wherein steps (g), (d) and (e) are not performed while step (f) is being performed.

7. The method as recited in claim 1, further comprising:
   (g) computing a real-time filtered estimate of the signal power threshold based on the signal power of the received signal for the samples, an initial noise power and a desired probability of false alarm; and
   (h) sending the signal power threshold to a signal power threshold comparator that performed step (c).

8. The method as recited in claim 7, further comprising:
   (i) generating desired probability of false alarm and desired probability of detection curves;
   (j) constructing a look-up table comprising data values representing the desired probability of false alarm and desired probability of detection curves generated in step (i); and
   (k) retrieving the window length and the phase difference threshold from the look-up table based on a desired probability of false alarm, a desired probability of detection and a measured signal-to-noise ratio.

9. The method as recited in claim 1, further comprising:
   (g) storing the data sets of parameter values of the information vectors in a non-transitory tangible computer-readable storage medium;
   (h) identifying a signal emitter based on the stored data sets of parameter values;
   (i) locating the signal emitter relative to a frame of reference; and
   (j) sending control signals to an actuator controller of a vehicle, which control signals direct a movement of the vehicle based on a location of the signal emitter determined in step (i).

10. The method as recited in claim 1, further comprising:
    (g) determining that the second-order difference estimated in step (d) is no longer less than a phase difference threshold; and
    (h) ending step (f) in response to step (g).

11. A method for detecting pulses in a received signal in a streaming manner, comprising:
    (a) sampling a received signal to produce samples which are in digital format;
    (b) estimating a respective signal power of the received signal for each sample;
    (c) determining that the signal power estimated in step (b) is less than a signal power threshold;
    (d) estimating a respective d-th-order difference of phases of a multiplicity of the samples within a window subsequent to step (c), wherein d is an integer greater than unity;
    (e) determining that the d-th-order difference estimated in step (d) is less than a phase difference threshold; and
    (f) processing the samples within the window to generate information vectors comprising respective data sets of parameter values of pulses in the received signals.

12. The method as recited in claim 11, further comprising:
    (g) estimating a respective instantaneous signal phase of the received signal for each signal sample subsequent to step (c) and prior to step (d).

13. The method as recited in claim 12, wherein step (f) is performed with a time delay that is a function of latency inherent in performance of steps (g), (d) and (e) in succession.

14. The method as recited in claim 13, wherein steps (g), (d) and (e) are not performed while step (f) is being performed.

15. The method as recited in claim 11, further comprising:
    (g) determining that the second-order difference estimated in step (d) is no longer less than a phase difference threshold; and
    (h) ending step (f) in response to step (g).

16. A system for detecting pulses in a received signal in a streaming manner, comprising:
    a transducer for converting received energy waves into a received signal in electrical form;
    a filter for passing a portion of the received signal having a frequency within a selected frequency bandwidth;
    an analog-to-digital converter configured to sample the received signal output by the filter to produce signal samples;
    a pulse processing module configured to process the signal samples to generate information vectors comprising respective data sets of parameter values of pulses in the received signals;
    a buffer configured to store a window of signal samples;
    a signal power detector configured to direct the signal samples to the pulse processing module if a signal power in excess of a signal power threshold is detected or to direct the signal samples to the buffer if the signal power is not in excess of the signal power threshold; and
    a pulse modulation detector connected to receive the signal samples which are sent to the buffer and configured to direct the signal samples from the buffer to the pulse processing module if a second-order difference in phase of successive signal samples in the window is less than a phase difference.

17. The system as recited in claim 16, wherein the signal power detector comprises:

a signal power estimation module configured to estimate a respective signal power of the received signal for each sample; and a signal power threshold comparator configured to determine whether the signal power estimated by the signal power estimator is greater than a signal power threshold or not.

18. The system as recited in claim 17, wherein the pulse modulation detector comprises:

a complex sample estimation module configured to compute a phase of each sample;

a phase difference estimation module configured to estimate a respective second-order difference of phases of a multiplicity of the samples within the window; and a second-order difference threshold comparator configured to determine whether the second-order difference estimated by the phase difference estimation module is less than a phase difference threshold or not.

19. The system as recited in claim 16, further comprising a first selector connected to receive the signal samples and pass the signal samples either to the pulse processing module or to the phase modulation detector in dependence on a selector state control signal output by the signal power detector.

20. The system as recited in claim 19, further comprising a second selector connected to receive the signal samples from the buffer and pass or not pass the signal samples from the buffer to the pulse processing module in dependence on a selector state control signal output by the phase modulation detector.

21. The system as recited in claim 16, further comprising:

a non-transitory tangible computer-readable storage medium storing the data sets of parameter values of the information vectors generated by the pulse processing module; and a computer system configured to identify a signal emitter based on the stored data sets of parameter values, locate the signal emitter and send control signals to an actuator controller of a vehicle, which control signals direct a movement of the vehicle based on a location of the signal emitter.

22. The system as recited in claim 16, further comprising a noise power estimation module configured to compute a real-time filtered estimate of the signal power threshold based on input sample powers, an initial noise power and a desired probability of false alarm.

23. The system as recited in claim 12, further comprising a probability of false alarm/probability of detection table configured to use the signal power threshold from the noise power estimation module to produce a window length and the phase difference threshold.

* * * * *